(12) United States Patent
McCormick

(10) Patent No.: US 7,496,439 B2
(45) Date of Patent: Feb. 24, 2009

(54) MULTIFUNCTION EXTERIOR DISPLAY FOR A VEHICLE MIRROR

(75) Inventor: Malcolm B. McCormick, Blythewood, SC (US)

(73) Assignee: Lang Mekra North America, LLC, Ridgeway, SC (US)

( * ) Notice: Subject to any disclaimer, the term of this patent is extended or adjusted under 35 U.S.C. 154(b) by 499 days.

(21) Appl. No.: 11/252,076

(22) Filed: Oct. 17, 2005

(65) Prior Publication Data

US 2007/0088481 A1 Apr. 19, 2007

(51) Int. Cl.
*B60Q 1/00* (2006.01)

(52) U.S. Cl. ......................................... 701/49; 362/460

(58) Field of Classification Search ................... 701/49; 340/435, 436, 438, 901–904; 362/460, 464, 362/459, 487, 488, 494, 546; 313/483, 484, 313/491, 500; 257/79, 98, 99
See application file for complete search history.

(56) References Cited

U.S. PATENT DOCUMENTS

| | | | |
|---|---|---|---|
| 4,882,565 A | 11/1989 | Gallmeyer | |
| 5,303,205 A | 4/1994 | Gauthier et al. | |
| 5,574,426 A * | 11/1996 | Shisgal et al. | 340/435 |
| 5,631,638 A | 5/1997 | Kaspar | |
| 5,650,765 A * | 7/1997 | Park | 340/436 |
| 5,734,336 A | 3/1998 | Smithline | |
| 6,099,154 A | 8/2000 | Olney | |
| 6,124,647 A | 9/2000 | Marcus | |
| 6,363,326 B1 | 3/2002 | Scully | |
| 6,512,624 B2 | 1/2003 | Tonar | |
| 6,534,884 B2 * | 3/2003 | Marcus et al. | 370/10.1 |
| 6,642,839 B1 | 11/2003 | Gunderson | |
| 6,879,248 B2 * | 4/2005 | Flick | 340/435 |
| 6,894,608 B1 | 5/2005 | Gunderson | |
| 6,914,521 B2 | 7/2005 | Rothkop | |
| 6,933,837 B2 | 8/2005 | Gunderson | |
| 7,195,381 B2 * | 3/2007 | Lynam et al. | 362/494 |
| 7,341,264 B2 * | 3/2008 | Swannie | 280/164.1 |
| 2001/0008992 A1 | 7/2001 | Saito et al. | |
| 2004/0080431 A1 | 4/2004 | White | |
| 2004/0201548 A1 | 10/2004 | Watanabe et al. | |

(Continued)

FOREIGN PATENT DOCUMENTS

DE 200 16 360 U1 1/2001

(Continued)

*Primary Examiner*—Dalena Tran
(74) *Attorney, Agent, or Firm*—McNair Law Firm, P.A.; Seann P. Lahey

(57) ABSTRACT

A display unit carried in an exterior rearview mirror assembly having a generic display matrix displaying numbers, text and indicia interchangeably. A vehicle status sensor in communication with the display unit for providing vehicle status information for display, and a proximity sensor in communication with the display unit for providing object avoidance information for display in the form of a distance measurement between the vehicle and an object in the vehicle's path. A controller carried in the vehicle interior operatively associated with the display unit for selectively displaying object avoidance information or vehicle status information based on whether the vehicle is placed in a reverse gear. A display driver in communication with the controller causes the display unit to display the vehicle status information when the vehicle is not in a reverse gear, and to display the object avoidance information when the vehicle is place in a reverse gear.

19 Claims, 6 Drawing Sheets

U.S. PATENT DOCUMENTS

| | | |
|---|---|---|
| 2004/0202001 A1 | 10/2004 | Roberts et al. |
| 2004/0230358 A1* | 11/2004 | Stam et al. .................... 701/49 |
| 2005/0073433 A1 | 4/2005 | Gunderson |
| 2005/0190082 A1 | 9/2005 | Kumata et al. |
| 2005/0190952 A1 | 9/2005 | Nagasawa et al. |

FOREIGN PATENT DOCUMENTS

| | | |
|---|---|---|
| DE | 100 37 130 A1 | 4/2001 |
| DE | 201 10 339 U1 | 10/2002 |
| DE | 10 2004 005707 A1 | 8/2005 |
| EP | 1 201 501 A2 | 5/2002 |
| EP | 06 02 2181 | 4/2007 |
| JP | 55 039843 A | 3/1980 |
| JP | 59 130754 A | 7/1984 |
| WO | WO 96/14222 A | 5/1996 |

* cited by examiner

MULTIFUNCTION EXTERIOR DISPLAY FOR A VEHICLE MIRROR

BACKGROUND OF THE INVENTION

1) Field of the Invention

The present invention relates generally to vehicle rearview mirror assemblies, and more particularly, to an exterior vehicle rearview mirror display providing for the display of multiple and variable information to assist the driver.

2) Description of Related Art

The prior art includes a variety of information displays for automotive use. Heavy equipment manufacturers and users, in particular, are in need for such products to improve the operational safety of their vehicles. Heavy equipment drivers such as semi-tractor trailer drivers utilize a large part of their driving concentration looking into their main rearview driving mirrors, typically mounted on an exterior of the vehicles, to evaluate conditions to the left and right of the vehicle, and to the limited extent possible, conditions directly behind the vehicle. Given the significant need and amount of time drivers spend looking in their exterior rearview mirrors, the ability to provide a display for mirrors on heavy equipment vehicles which can assist the driver by providing supplemental types of information in the vehicle mirror is particularly advantageous. While information displays for automobiles or passenger vehicles have been provided from simple "tell-tales" on the dashboard or rearview mirror to heads-up displays with full graphics and video capability, these systems are mostly suitable for use and display inside the vehicle, as opposed to exterior applications. Further, exterior mirrors that do have illuminated information displays are intended primarily to inform drivers in surrounding vehicles, or include dedicated displays for providing limited vehicle information.

For example, U.S. Publication No. 2004/0080431 discloses a distance measuring display in a vehicle rearview mirror assembly showing approximated distances represented by the numbers 1, 2 and 3, without precise and accurate distance measurements. The system is not capable of displaying other or multiple information to assist the driver or warn other nearby vehicles, nor is it suitable for exterior applications to allow heavy equipment and large vehicle operators to precisely maneuver their vehicles.

U.S. Pat. No. 5,631,638 discloses an information display for an interior center rearview mirror, which is able to display information related to vehicle status and traffic information. A similar mirror display system is disclosed in U.S. Publication No. 2004/0202001, which discloses an interior display for displaying various types of information. However, such interior rearview mirror assemblies are not particularly suitable for exterior mirror assemblies used by semi-tractor trailer drivers. In addition, the LCD displays often used in interior mirror assemblies are vulnerable to temperature and other ambient conditions if used in exterior applications.

Other mirror systems, such as that disclosed by U.S. Pat. No. 6,099,154 have a display with a series of lightable indicia. Because these indicia are fixed in the display, there is no ability to vary the information. These systems are primarily useful to inform other drivers around the vehicle that the vehicle is turning, for example.

Another example is U.S. Pat. No. 6,124,647, which discloses an information display located rearward of the vehicle mirror that projects a reverse image into the mirror to be viewed by the driver to display a variety of information. This system is unsuitable for exterior applications in heavy duty vehicles such as on a semi-tractor trailer which pivots in relation to a cab.

Accordingly, it is an object of the present invention to provide an exterior rearview mirror assembly incorporating a generic display capable of displaying a variety of information on the exterior of a large vehicle or heavy equipment.

It is a further object of the present invention to provide a multifunction information display for exterior vehicle left and right side view mirrors that supplements the information available to the driver from the mirrors.

It is a further object of the present invention to provide a multifunction information display that switches automatically between information types depending on the vehicles mode of operation.

It is a further object of the present invention to provide a multifunction display capable of simultaneously displaying different sets of information on the exterior of a large vehicle or heavy equipment.

SUMMARY OF THE INVENTION

The above objectives are accomplished according to the present invention by providing an exterior vehicle rearview mirror assembly having a multifunction information display. The mirror assembly includes an exterior mirror housing and a mirror glass carried by the mirror housing having a reflective coating adapted for viewing a display through the mirror glass. An exterior display unit is carried by the mirror housing being viewable through the mirror glass for displaying vehicle status information and object avoidance information. Preferably, the display unit includes an exterior display comprising a matrix of light emitting diodes (LED) constructed and arranged in the exterior mirror housing in a manner that is suitable for exterior application and tolerable of changes in environmental conditions. An interior control unit is carried within the vehicle interior is provided in communication with the display unit for selectively displaying at least one of the vehicle status information and the object avoidance information on the display unit. A computer readable medium is provided in communication with the interior control unit having a set of instructions embodied in the computer readable medium for receiving, adapting, and transmitting the vehicle status information from the interior control unit to the display unit, and switching the display to show object avoidance information when the vehicle is placed in a reverse mode of operation.

A vehicle status sensor is provided in communication with the display controller for providing the vehicle status information. The vehicle status sensor transmits information alerting to on-board vehicle conditions. Additionally, a proximity detector is provided in communication with the display controller for providing the object avoidance information. Preferably, the object avoidance information from the proximity detector is provided as a distance measurement in one of inches and centimeters designating the distance between the vehicle and an object in the vehicles path. In a further advantageous embodiment, the object avoidance information includes video from at least one video camera on the vehicle in communication with the display controller.

In the preferred embodiment, the display unit consists of an alpha-numeric matrix wherein the matrix is sufficiently generic to display both the vehicle status information and object avoidance information, or other variable programmed information. In one advantageous embodiment, the alpha-numeric matrix includes LED element grouped into a plurality of LED segments with each segment being reconfigurable and operatively associated with the display controller for displaying a single character of information. Advantageously, the LED segments are combined to form a common display area able to selectively display different types of information. In one preferred arrangement, each LED segment is defined by five columns of LEDs with seven LEDs vertically aligned in each column.

In a further advantageous embodiment, a proximity detectors are provided in communication with the display controller for providing the object avoidance information. In this arrangement, the LED matrix is operatively associated with the display controller to simultaneously display information from multiple proximity detectors. In an alternative embodiment, the LED matrix includes first LED segments grouped together in communication with the display controller for displaying the vehicle status information, and second LED segments grouped together for displaying the object avoidance information. The first and second LED segments can be operated to simultaneously display the vehicle status information and the object avoidance information when the reverse gear is selected.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

The left and right side exterior rearview mirrors on large heavy duty vehicles and equipment are a convenient location for vehicle status displays since the driver regularly checks the mirrors when driving or backing the vehicle. Accordingly, the invention is directed to a generic multiuse display for exterior mirrors of heavy vehicles, to display various vehicle status information, such as outside ambient temperature, turn signals, text and number warning messages and other indicia alerting the driver to a variety of vehicle conditions. In addition, the display has a dual mode functionality capable of displaying standard information in one mode, and displaying detailed object avoidance information from proximity detectors as to the distance of the vehicle, particularly the rear, to any object in the vehicle's path, in a second mode.

The present invention is described below, in part, with reference to flowchart illustrations of methods, apparatus, systems and computer program products according to the invention. It will be understood that each block of a flowchart illustration can be implemented by a set of instructions in a computer readable medium. These computer readable instructions may be loaded onto a general purpose computer, special purpose computer, or other programmable data processing apparatus to produce instructions executable on a computer or other data processing apparatus to create a means for implementing the functions specified in the flowchart block or blocks.

Computer program instructions may be loaded onto a computer or other programmable apparatus to produce a computer executed process such that the instructions are executed on the computer or other programmable apparatus provide steps for implementing the functions specified in the flowchart block or blocks. Accordingly, elements of the flowchart support combinations of means for performing the special functions, combination of steps for performing the specified functions and program instruction means for performing the specified functions. It will be understood that each block of the flowchart illustrations can be implemented by special purpose hardware based computer systems that perform the specified functions, or steps, or combinations of special purpose hardware or computer instructions. The present invention is now described more fully herein with reference to the drawings in which a preferred embodiment of the invention is shown.

Figure 1:
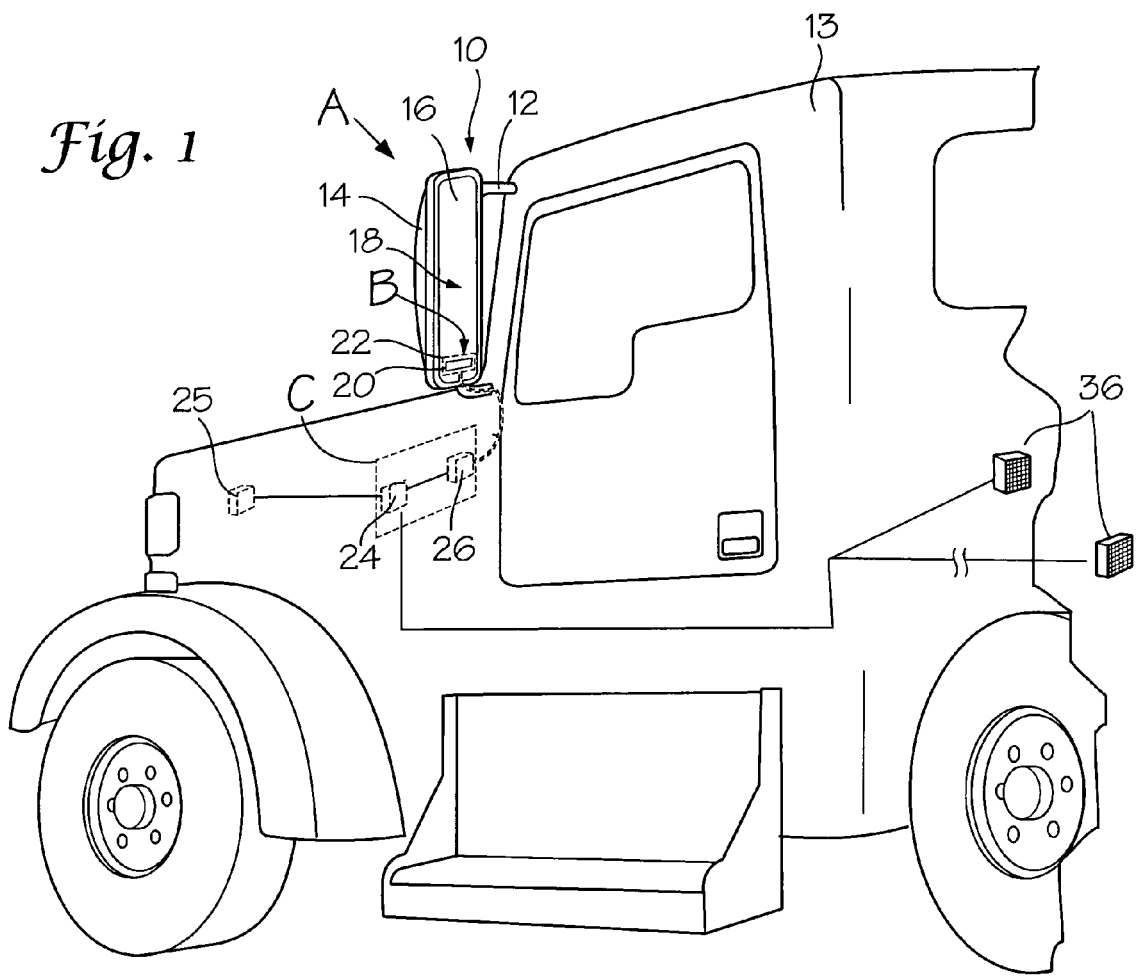
FIG. 1 is a perspective view illustrating a heavy duty vehicle cab having an exterior mirror assembly according to the present invention with an exterior mirror head having a multi-function display, and an interior display controller.

Referring to FIG. 1, a vehicle rearview mirror assembly, designated generally as A, is shown having a generic multi-function information display, designated generally as B. The mirror assembly includes a mirror head 10 mounted to an attachment assembly 12, which is affixed to the exterior of a large heavy duty vehicle cab 13. Mirror head 10 includes a mirror housing 14 and a mirror glass 16 carried by mirror housing 14. Mirror glass 16 is provided with a reflective coating 18 adapted for viewing a display through mirror glass 16. An illuminating display unit 20 is carried by mirror housing 14 on the exterior of vehicle cab 13 being viewable through mirror glass 16 for displaying, for example, vehicle status information and object avoidance information. Display unit 20 preferably utilizes LED (light emitting diode) display type technology in order to provide performance and reliability acceptable for exterior vehicle use to accommodate harsh ambient conditions, temperature and humidity changes, and other environmental factors.

In a preferred embodiment, to provide the ability to view display unit 20 through reflective coating 18, an optically transmissive window 22 is formed in reflective coating 18. Display unit 20 is located adjacent window 22 in mirror housing 14 for displaying through window 22. Optically transmissive window 22 may be formed by removing reflective coating 18 completely from mirror glass 16, or alternatively, reducing the thickness of reflective coating 18 or otherwise altering its light reflectance and light transmissive qualities to view the display through mirror glass 16.

Figure 2:
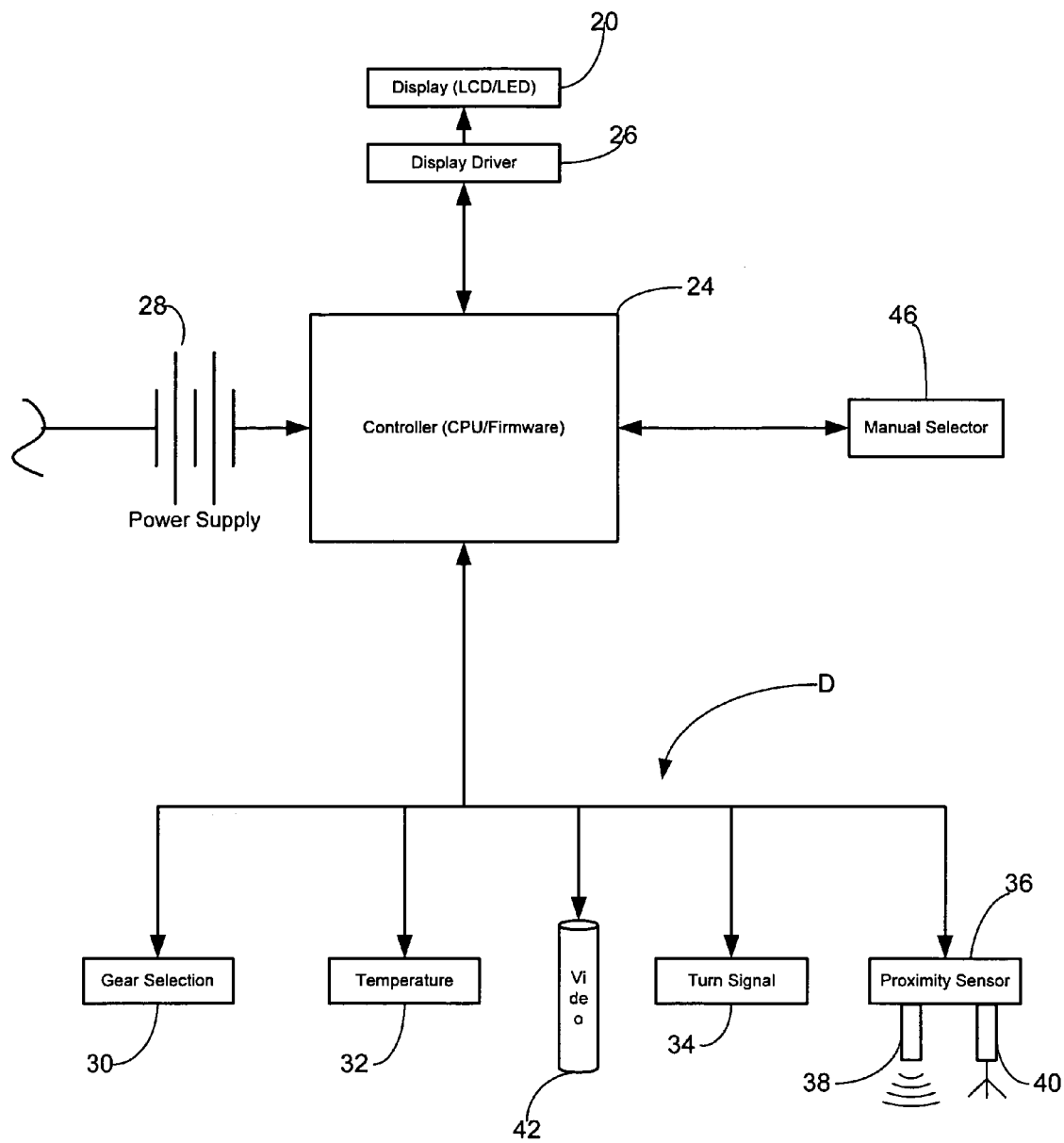
FIG. 2 is a schematic view of the mirror assembly according to the present invention.

Referring to FIGS. 1 and 2, the display system is provided with an interior control unit, designated generally as C in FIG. 1, carried within the vehicle interior to limit exposure of electronic components to environmental conditions. In the illustrate embodiment, interior control unit C includes a controller 24, which receives various signals from vehicle status sensors that are located throughout the vehicle, such as engine temperature sensor 25, or from the on-board vehicle computer and from proximity sensors 36 located around the periphery of the vehicle. Controller 24 processes the signals from the sensors or vehicle computer and transmits sensory information to a display driver 26, also included in interior control unit C, which converts the information and manipulates display unit 20 to display the information. Controller 24 is connected to a power supply 28, which can be the vehicle power source or a separate power source.

Figure 3:
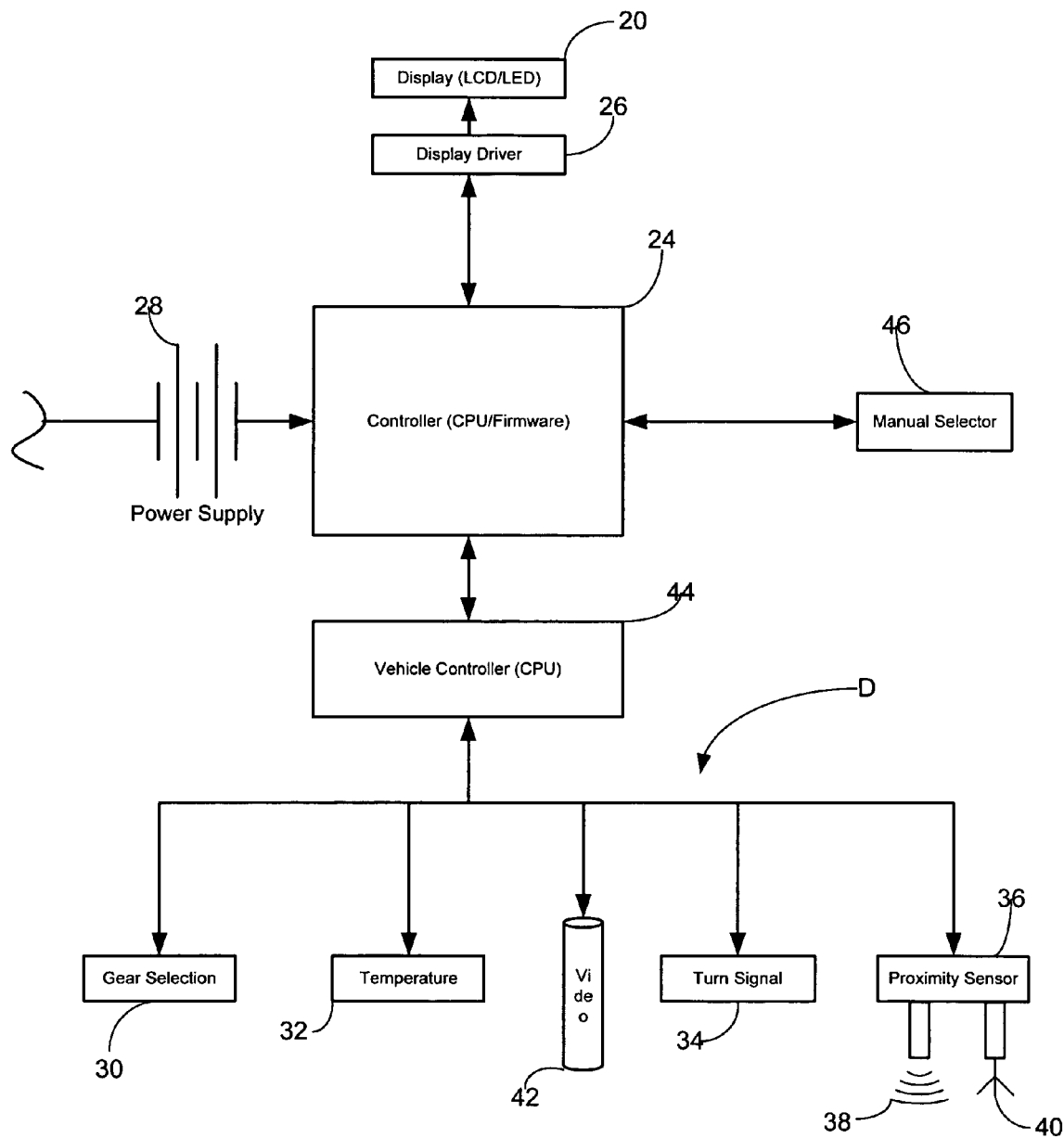
FIG. 3 is a schematic view of the mirror assembly according to an alternative embodiment of the present invention.

Various sensors, designated generally as D in FIGS. 2 and 3, are connected to controller 24 for providing information for display. Sensors D can be any of a multitude of sensors found in modern vehicles to provide information such as temperature readings, turn signals, text, numbers and indicia alerting to a variety of vehicle conditions, and any combination thereof. By way of example, in the illustrated embodiment, the sensors include various vehicle status sensors such as a gear selection sensor 30, a temperature sensor 32, and a turn signal sensor 34. A vehicle status sensor could be provided to monitor any particular aspect of the vehicle's operation. It should be understood that any information related to a vehicle device may be displayed. In use, the vehicle status information to be displayed on display unit 20 may be any information obtained by vehicle sensors and system monitoring devices on-board the vehicle.

However, the vehicle status information does not include object avoidance information related to detecting objects around the vehicle. For purposes of the present invention, such object avoidance information is separate and distinct from vehicle status information such as temperature readings.

Signals the vehicle status sensors are transmitted to controller 24 where the signals are processed. Each signal is processed according to computer readable instructions embodied in controller 24 and transmitted to display driver 26 to be adapted for reading on display unit 20.

In one preferred embodiment, gear selection sensor 30 detects the operation mode of the vehicle, and in particular, detects when the vehicle is place in reverse and transmits a signal to controller 24. In the preferred embodiment, this signal is received by controller 24 which causes display unit 20 to switch from showing vehicle status information to displaying object avoidance information provided by the various proximity sensors 36.

The display information signal transmitted from controller 24 is received by display driver 26. Display driver 26 is wired or otherwise electronically coupled to display unit 20 for selectively displaying information from at least one of the vehicle status sensors on display unit 20. Display driver 26 processes the information from controller 24 according to computer readable instructions to arrange the information for display on display unit 20. The display information signal is transmitted from display driver 26 to display unit 20. In this manner, controller 24 and display driver 26 can be programmed to provide various information for display on display unit 20. While controller 24 transmits signals to display driver 26 containing the processed information from the various vehicle sensors, such as temperature sensor 32, it is display driver 26 that converts the received information to be provided to the user via display unit 20.

Referring to FIGS. 1 and 2, in addition to the vehicle status sensors 30, 32, 34, and 42, proximity sensors 36 are coupled to controller 24. Proximity sensors 36 are provided in communication with display driver 26 through controller 24 for providing object avoidance information for display on display unit 20. While a single proximity sensor or detector may be used on the rear of the vehicle, it is preferred to include multiple proximity sensors on both the front, rear, and even the sides of the vehicle to assist the driver, particularly in large vehicles such as semi-tractor trailers. Proximity sensors 36 can be any one of a number of well known on-board vehicle object detection systems, such as ultra-sonic, radar, or infrared emitters and receivers which transmits energy that bounces off of an obstacle and is measured by the detector to determine distance.

Each proximity sensor 36 transmits data to controller 24 for processing and then display on display unit 20 by display driver 26. Each proximity sensor includes an emitter 38 for producing an ultrasonic radar or infrared energy transmission that bounces off of obstacles in proximity to the vehicle. Some of the emitted energy is then bounced back and received by a receiver 40 included in each of proximity sensors 36. The distance is determined by measuring the time required for the energy to travel to and from the obstacle. This measurement is communicated to controller 24 and can be converted into a desired distance measurement which is transmitted to display driver 26.

In one preferred embodiment, object avoidance information from proximity sensors 36 is provided as a standard distance measurement defined in one of inches or centimeters designating the distance between the vehicle and an object in the vehicles path in order to provide a precise measurement to assist the driver.

In a further advantageous embodiment, the object avoidance information may include video from at least one video camera 42 on the vehicle in communication with controller 24. The video may be combined with proximity sensor 36 for display to provide the driver with extensive information to supplement the reflected view from the vehicle mirrors.

As illustrated in FIG. 3, some vehicles have a vehicle controller 44 which communicates with gear selector sensor 30, temperature sensor 32, turn signal sensor 34, as well as proximity sensor 36 and video camera 42. Vehicle controller 44 may be the central processor of the vehicle which monitors all the vehicles systems. Controller 24 of interior control unit C may be instructed to monitor vehicle controller 44 to provide display information from the various sensors controlled or monitored by vehicle controller 44.

Referring to FIGS. 2 and 3, in a further advantageous embodiment of the invention, a manual input selector 46 can be provided in communication with controller 24 for switching between displaying vehicle status information and object avoidance information. Additionally, manual input selector 46 can be used to switch between object avoidance information from a plurality of proximity sensors.

Figure 4A:
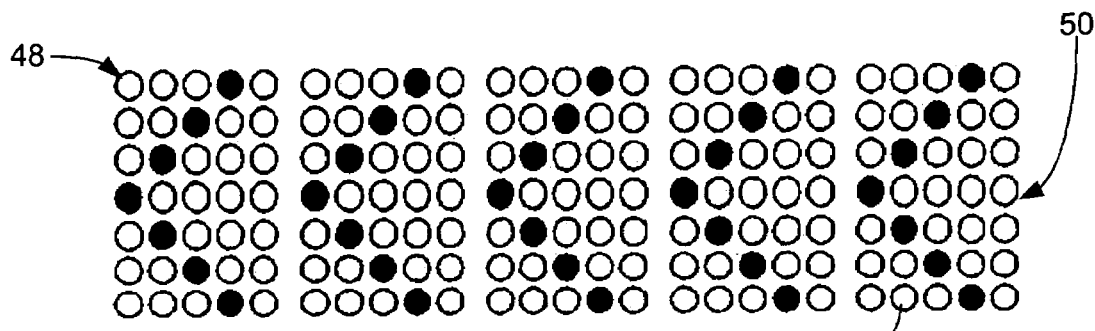
FIGS. 4a-c shows different information displayed on the generic alpha-numeric display matrix of the present invention.
Figure 4B:
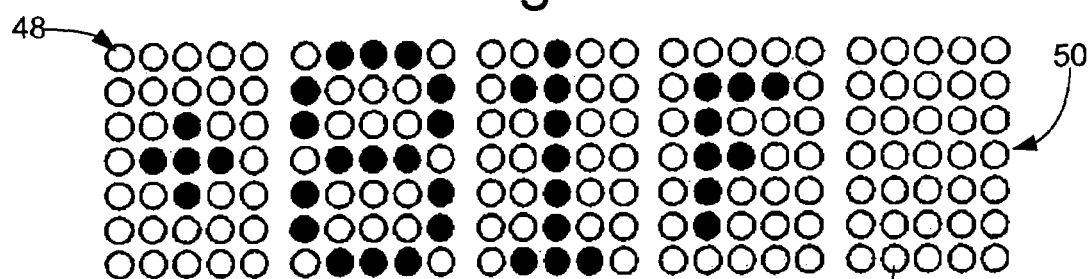
Figure 4C:
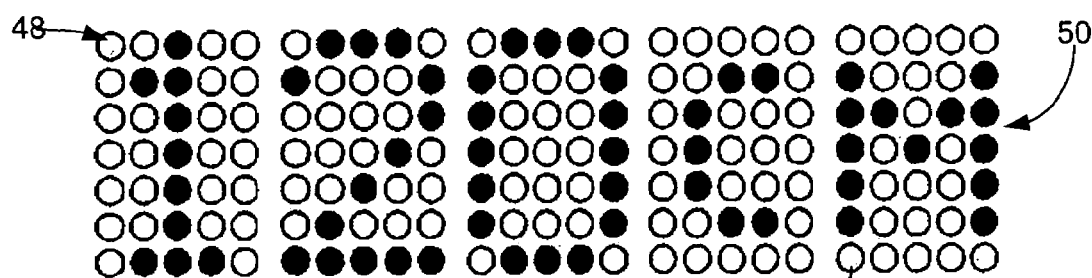

Referring to FIGS. 4a-4c, the display unit provides a generic reconfigurable display that can be used to display a variety of messages or graphics. In a preferred embodiment, the display unit comprises a generic alpha-numeric display matrix 50. Display matrix 50 may be constructed from a plurality of LED segments 48. Each segment 48 is operatively associated with display driver 26 to activate LED elements to display a single character of information. Each LED segment 48 preferably consisting of a plurality of individual LED elements 49 arranged into five columns of LED elements 49 with seven LED elements 49 vertically aligned in each column to form repeating 5×7 LED segments 48. While a 5×7 LED segment 48 is preferred, the segments may be larger or smaller, such as a 3×3 LED segment to fit the desired amount of information to be displayed or fit within the confines of a given mirror assembly. The plurality of LED segments 48 are combined to form the reconfigurable display matrix 50 having a capacity to display a variety of information.

For example, in FIG. 4a, alpha-numeric display matrix 50 is adapted to display a turn signal graphic. In FIG. 4b, alpha-numeric display matrix 50 is shown displaying a temperature reading. In FIG. 4c, alpha-numeric display matrix 50 is reconfigured to display a proximity distance reading to an object in the vehicles path. Accordingly, the matrix may be reconfigured to display specific information at a designated portion of the display and adjusted as desired by controller 24 and display driver 26 to display any desired information collected by sensors D.

This approach makes the best use of the space available in the mirror enclosure by avoiding multiple display units to display specific indicia or text and number warning messages or other information. Thus, it can be seen that an advantageous construction can be had for a generally universal mirror head having a generic display that is sufficient for external use on different types of vehicles to display a variety of messages or graphics depending on the needs of the vehicle. For this purpose, interior control unit C can be modified and programmed according to the desired sensors and information to be displayed and adapted to work with a variety of equipment for providing a generic capacity to work in with different vehicles.

Figure 5:
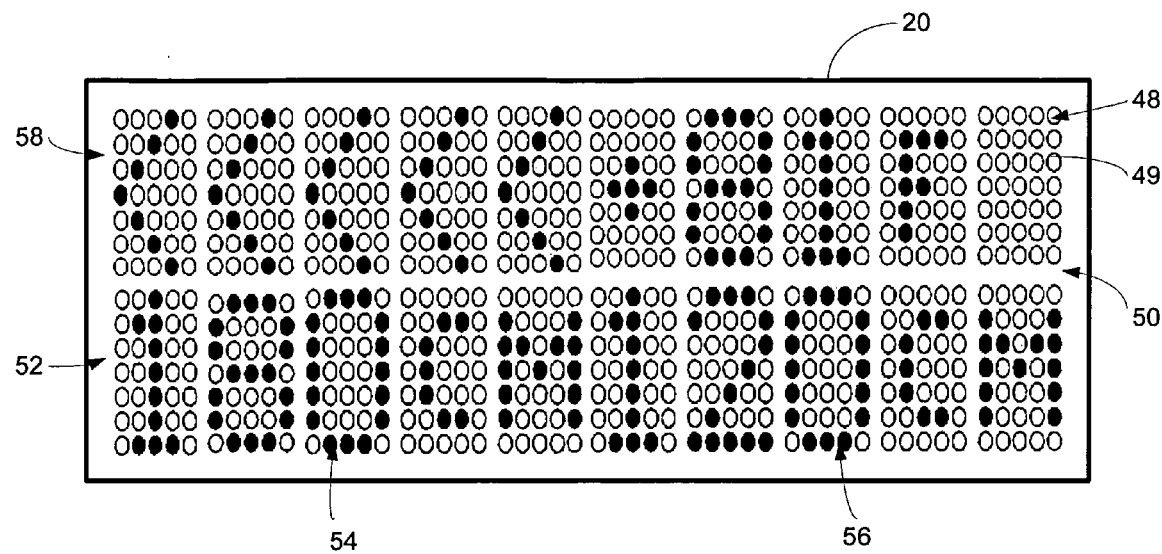
FIG. 5 shows an alternative embodiment of the generic alpha-numeric display matrix according to the present invention; and, FIG. 6 is a detailed view of a further alternative arrangement for the generic alpha-numeric display matrix according to the present invention; and, FIG. 7 is a flow chart of the dual mode capacity of the generic alpha-numeric display matrix according to the present invention.

Referring to FIG. 5, in another embodiment, display unit 20 includes a larger alpha-numeric matrix 50 with two rows of repeating 5×7 LED segments 48. This approach allows information from multiple proximity sensors 36 to be displayed individually or simultaneously. The display could accordingly be switched manually or automatically between left, right, rear or even front proximity detectors 36 by use of manual input selector 46 or as programmed into the firmware of controller 24. Preferably, a plurality of proximity detectors 36 are placed in communication with controller 24 for providing object avoidance information to display driver 26. In this embodiment, display unit 20 is constructed and arranged to have selected LED segments which simultaneously display distance measurement information from multiple proximity sensors 36. As shown in FIG. 5, a bottom row of LED segments 52 display information from a first proximity detector on LED segments 54, and information from a second proximity detector is displayed at the same time on LED segments 56.

Additionally, referring to FIG. 5, display unit 20 may be constructed and arranged to include first LED segments, designated as 58, defining the top row of display unit 20 in communication with display driver 26 for displaying vehicle status information. Second LED segments, designated as 52, defining the bottom row of display unit 20 are also provided in communication with display driver 26 for simultaneously displaying object avoidance information, for example, when the reverse gear is selected, as detected by gear selection sensor 30 and transmitted to controller 24, which signals display driver 26 to configure display unit 20 accordingly.

Figure 6:
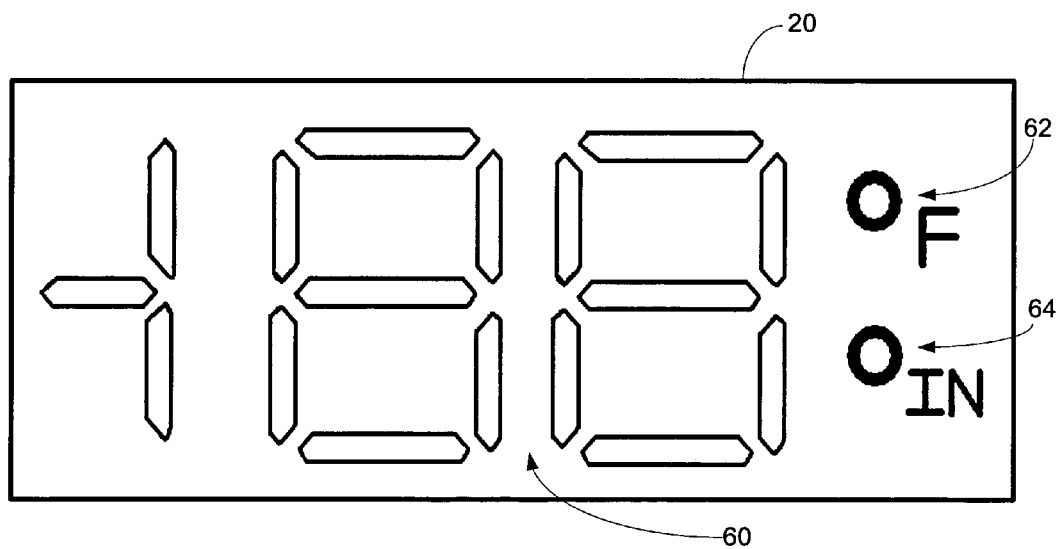

Referring to FIG. 6, the invention may also be practiced with a display unit 20 that includes a three digit display portion, designated generally as 60. This arrangement of display unit 20 will also includes at least one of indicia representing degrees Fahrenheit or Celsius, designated as 62, for displaying vehicle status information in the form of a temperature reading. Display unit 20 will also include in this arrangement at least one of indicia representing inches or centimeters, designated as 64, for displaying object avoidance information in the form of a distance measurement to an object in the vehicle's path. Display driver 26 switches three digit display 60 from displaying a temperature reading to displaying a distance measurement as required. Preferably, indicia 62 representing degrees Fahrenheit or Celsius is displayed when the vehicle is not in reverse, and indicia 64 representing inches or centimeters is displayed when reverse gear selection is detected. Preferably, the temperature indicia 62 would consist of the characters "° F." or "° C.", and the distance indicia 64 consist of the characters "cm" or "in". Preferably, indicia 62 and 64 would be located to the right of the three digit display.

Figure 7:
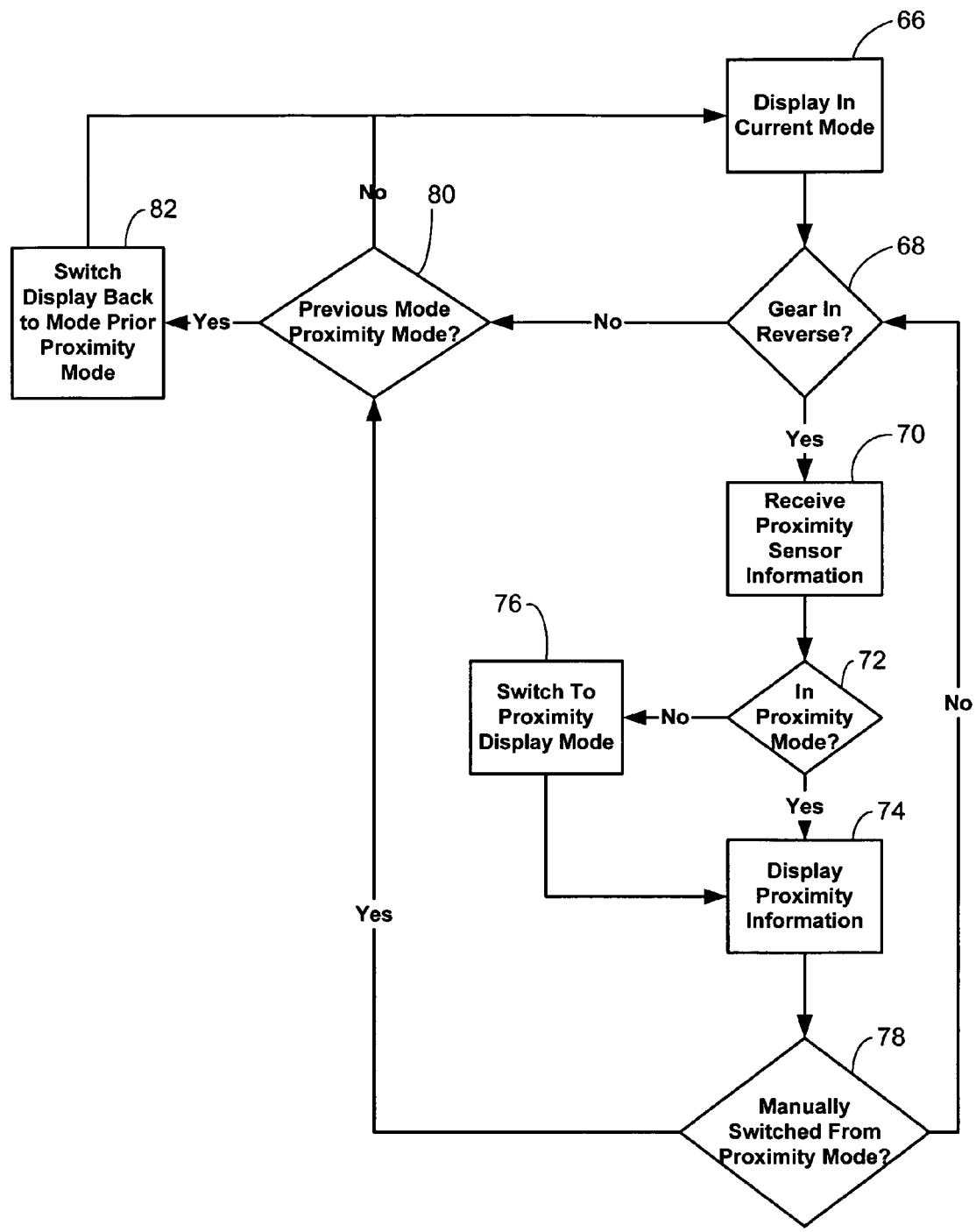

Referring to FIG. 7, in describing the operation of the system, a computer readable medium is provided in communication with controller 24 having a set of instructions embodied in the computer readable medium for transmitting display information received by controller 24 to display driver 26. Display driver 26 is also operatively associated with a computer readable medium having a set of instruction embodied in the computer readable medium for transmitting the display information to display unit 20 and activating the individual lights (e.g. LED elements) of the display to show the information.

In one embodiment, when the vehicle is turned on controller 24 then begins to communicate with the various vehicle systems such as sensors 30, 32, and 34, or as shown in FIGS. 2 and 3, vehicle controller 44. At startup, controller 24 determines the current display mode 66 and provides display driver 26 with vehicle status information or object avoidance information. Given the current display mode in step 66, controller 24 communicates with gear selection sensor 30 to determine if the vehicle is in a forward or reverse gear in step 68. If gear selection sensor 30 transmits to controller 24 that a reverse gear is selected, object avoidance information is received from proximity sensors 36 by controller 24 in step 70. Controller 24 next determines if display unit 20 is displaying object avoidance information or vehicle status information in step 72. If display unit 20 is in proximity mode to display object avoidance information, the display information signal is transmitted to display driver 26 at step 74 for display. If controller 24 determines that display unit 20 is not in proximity display mode, controller 24 communicates to display driver 26 to switch display unit 20 at step 76 from display vehicle status information such as temperature, to displaying distance measurements from proximity sensors 36.

Using manual input selector 46, at step 78, controller 24 determines whether a manual selection has been made for a preferred display mode. Accordingly, if the display is in proximity mode and then a manual selection is made to display vehicle status information, controller 24 checks the current display mode at step 80. If the display unit was in proximity mode, controller 24 signals display driver 26 to switch the display to vehicle status information at step 82.

Controller 24 can also be programmed to display information from proximity sensors 36 individually, in combination, or together with vehicle status information and is not limited to simply switching the display between the two types of information. Further, as described above, manual input selector 46 is in communication with controller 24 for manually selecting information from a particular proximity sensor or multiple sensors for display.

The main left and right mirrors on heavy equipment vehicles are checked regularly by the vehicle driver. The unique displays disclosed herein are provided to make dual usage of the display for displaying vehicle status information and object avoidance information, and to generalize the display approach to allow the use of graphics symbols and to extend the range of messages that may be displayed in a vehicle rearview mirror.

While a preferred embodiment of the invention has been described using specific terms, such description is for illustrative purposes only, and it is to be understood that changes and variations may be made without departing from the spirit or scope of the following claims.

What is claimed is:

1. An exterior vehicle rearview mirror and display assembly for a heavy duty vehicle having a vehicle cab from which the vehicle is operated, said assembly comprising:
   a mirror housing carried on an exterior of the vehicle cab;
   a mirror glass carried by said mirror housing having a reflective coating;
   a display window included in said reflective coating;
   vehicle sensors for generating vehicle status information and object avoidance information;
   an exterior display unit carried in said mirror housing having a lightable display viewable by an operator through said display window for selectively displaying one of said vehicle status information and object avoidance information;
   an interior control unit disposed interiorly of said cab remote from said mirror housing in communication with said exterior display unit and said vehicle sensors, said interior control unit having a computer readable medium;
   a set of computer readable display instructions embodied in said computer readable medium which provide a dual mode operation for selectively displaying one of said vehicle status information and said object avoidance information on said display unit;
   said display instructions including instructions for receiving said vehicle status information and said object avoidance information at said control unit, detecting whether said vehicle is placed in a reverse drive, automatically transmitting said vehicle status display information to said display unit in response to detecting the vehicle is not in reverse drive, and automatically transmitting said object avoidance display information to said display unit in response to detecting said vehicle is in reverse drive.

2. The mirror assembly of claim 1 having a controller included in said interior control unit receiving and processing said vehicle status information and said object avoidance information and transmitting said vehicle status information and said object avoidance information to said display unit.

3. The mirror assembly of claim 2 having a display driver included in said interior control unit receiving said vehicle status information and object avoidance information from said controller and transmitting the information to said display unit in a form of display information adapted for display by activating said display unit.

4. The mirror assembly of claim 3 wherein said vehicle sensors includes a proximity sensor for transmitting said object avoidance information to said controller, and a vehicle status sensor for transmitting said vehicle status information to said controller.

5. The mirror assembly of claim 4 including a video camera carried on an exterior of said vehicle for providing said object avoidance information to said controller in the form of video for display on said display unit.

6. The mirror assembly of claim 4 wherein said object avoidance information from said proximity sensor is displayed as a numeric distance measurement approximating a distance between the vehicle and an object in the vehicles path.

7. The mirror assembly of claim 6 wherein said numeric distance measurement is displayed in one of feet, inches and centimeters.

8. The mirror assembly of claim 1 wherein said display unit includes a generic alpha-numeric display matrix viewable through said display window, said display matrix having a capacity to display a variety of reconfigurable display information for switching between displaying said object avoidance information and said vehicle status information.

9. The mirror assembly of claim 8 wherein said alpha-numeric display matrix includes individual LED elements grouped into LED segments with each said segment being reconfigurable by said interior control unit for displaying at least one character of information, and wherein a plurality of LED segments are combined to form said alpha-numeric display matrix.

10. The mirror assembly of claim 9 wherein each said LED segment is defined by five columns of LED elements with seven LED elements vertically aligned in each column.

11. The mirror assembly of claim 8 including a plurality of proximity sensors in communication with said interior control unit for providing said object avoidance information to said display unit, wherein said alpha-numeric display matrix of said display unit is operatively associated with said interior control unit to simultaneously display object avoidance information from multiple proximity sensors.

12. The mirror assembly of claim 8 wherein said alpha-numeric display matrix includes first LED segments grouped together in communication with said interior control unit for displaying said vehicle status information, and second LED segments grouped together in communication with said interior control unit for displaying said object avoidance information, wherein said first and second LED segments can be operated to selectively and/or simultaneously display said vehicle status information and said object avoidance information.

13. The mirror assembly of claim 1 wherein said display unit includes a three digit numeric LED display matrix having first lightable indicia for indicating a temperature reading is being displayed from said vehicle status information, and second lightable indicia for indicating a distance measurement is being displayed from said object avoidance information.

14. The mirror assembly of claim 1 wherein said display window consists of an optically transmissive window formed in said reflective coating adapted for passing light, wherein said display unit is located adjacent said window for displaying through said window.

15. A multifunction information display system for an exterior vehicle rearview mirror assembly on a heavy duty vehicle cab comprising:
   a mirror head for attachment to an exterior of the vehicle;
   an exterior display unit carried by said mirror head viewable through an adjacent display window having a capacity for displaying one or more of numbers, text and indicia through said display window;
   a vehicle status sensor in communication with said display unit providing vehicle status information for display;
   a proximity sensor in communication with said display unit providing object avoidance information for display in the form of a distance measurement between the vehicle and an object in the vehicle's path;
   an interior control unit for being carried on an interior of the vehicle cab in communication with said display unit, said vehicle status sensor, and said proximity sensor; and,
   said interior control unit having a dual mode of operation for selectively displaying one of said object avoidance information and said vehicle status information; and
   said control unit switching said display unit from displaying said vehicle status information to displaying said object avoidance information automatically when the vehicle is placed in reverse.

16. The mirror assembly of claim 15 wherein said display unit includes an alpha-numeric display matrix having individual LED elements grouped into LED segments with each said segment being reconfigurable by said interior control unit for displaying at least one character of information, and wherein a plurality of LED segments are combined to form said alpha-numeric display matrix.

17. The system of claim 16 wherein each said LED segment is defined by at least three columns of LED elements with at least three LED elements vertically aligned in each column.

18. The system of claim 17 including a plurality of proximity sensors in communication with said interior control unit for providing said object avoidance information, wherein said alpha-numeric matrix is operatively associated with said interior control unit to simultaneously display information from multiple proximity sensors.

19. The system of claim 15 wherein said display unit includes a three digit numeric LED display matrix having first lightable indicia for indicating a temperature reading is being displayed from said vehicle status information, and second lightable indicia for indicating a distance measurement is being displayed from said object avoidance information.

* * * * *